United States Patent [19]

Kuhn

[11] 4,118,821

[45] Oct. 10, 1978

[54] DEVICE FOR CLEANING SOLDERING IRON TIPS

[75] Inventor: Robert A. Kuhn, Grosse Pointe Park, Mich.

[73] Assignee: American Electrical Heater Company, Detroit, Mich.

[21] Appl. No.: 796,837

[22] Filed: May 13, 1977

[51] Int. Cl.² ............... B05C 11/105; B23K 37/00
[52] U.S. Cl. ................... 15/104.92; 118/268
[58] Field of Search ............ 15/104.92, 244 B, 244 C, 15/423; 118/268, 270; 131/236; 132/75

[56] References Cited

U.S. PATENT DOCUMENTS

| D. 223,101 | 3/1972 | Sylvester | D8/71 |
|---|---|---|---|
| 678,447 | 7/1901 | Whelan | 118/268 |
| 775,299 | 11/1904 | Holt | 118/268 |
| 1,735,046 | 11/1929 | Harris | 118/270 |
| 2,570,041 | 10/1951 | Wedmore | 15/236 A |
| 2,958,886 | 11/1960 | Taylor | 15/104.92 |
| 3,609,791 | 10/1971 | Siegel et al. | 15/114 |
| 3,948,678 | 4/1976 | Dezzani | 15/236 A X |
| 3,977,036 | 8/1976 | Vanyi | 15/104.92 X |

FOREIGN PATENT DOCUMENTS

| 624,818 | 1/1936 | Fed. Rep. of Germany | 118/270 |
|---|---|---|---|
| 1,013,396 | 7/1956 | Fed. Rep. of Germany | 118/270 |

*Primary Examiner*—Daniel Blum
*Attorney, Agent, or Firm*—Whittemore, Hulbert & Belknap

[57] ABSTRACT

The invention is a tip cleaning device especially designed for use with small or miniature soldering irons. It consists of a low profile case forming a self-contained water well with a shaft for supporting a wiping sponge having a central aperture of a size to receive the soldering iron tip. There is a wick between the wall and the underside of the sponge to keep the wiping sponge wet as long as there is water in the well.

4 Claims, 3 Drawing Figures

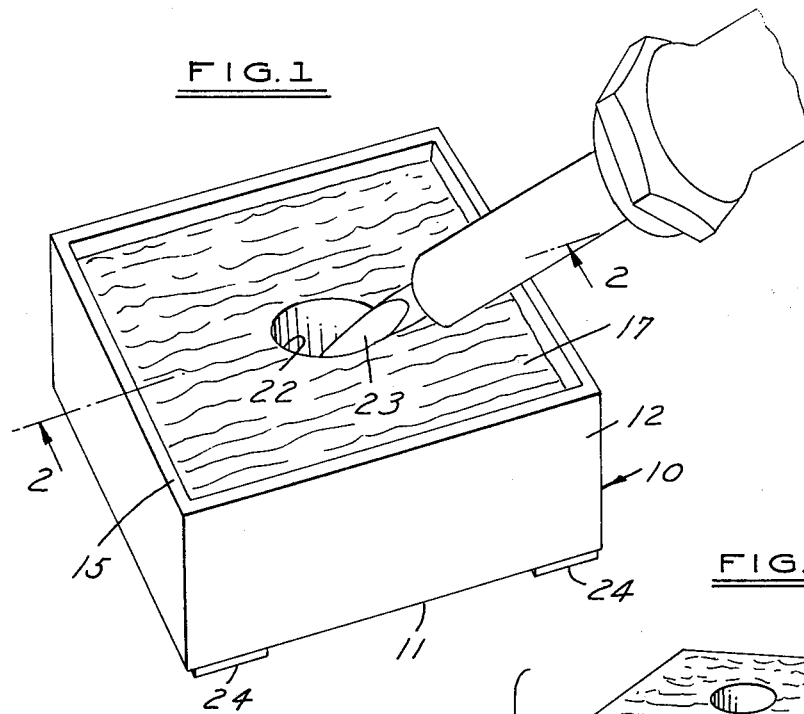
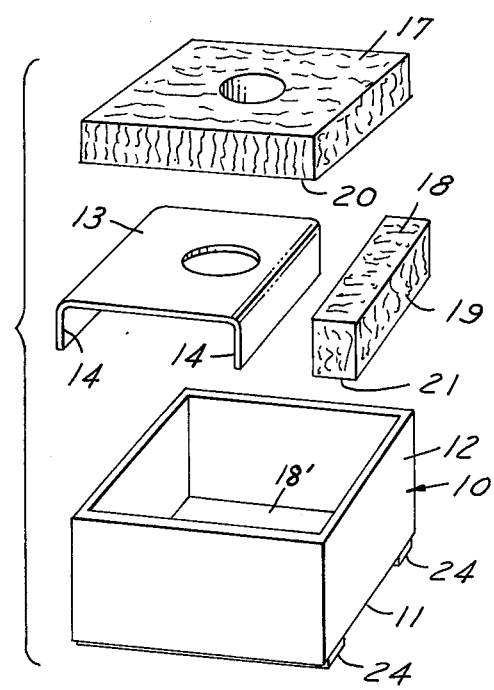
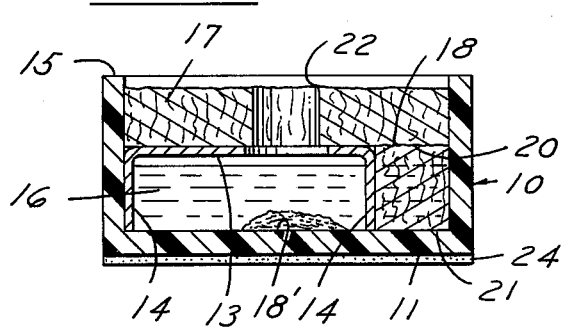

DEVICE FOR CLEANING SOLDERING IRON TIPS

BACKGROUND OF THE INVENTION

Soldering iron tips during operation accumulate excess solder, dross and burnt flux which require frequent removal which is accomplished by wiping the hot tip on a suitable material which must be kept suitably cooled, usually with running water supplied by hoses or bottles.

SUMMARY OF THE INVENTION

The present invention provides an improved device for cleaning hot soldering iron tips. The device is of simple design with no complicated parts and no auxiliary hoses or bottles. It consists of a low profile case serving as a self-contained water well containing enough liquid to last for several days without refilling and provided with a wiping sponge maintained in a constantly wet condition by a wick from the well to the sponge. This sponge has a central aperture of a size to provide a cylindrical wiping surface against which the tip may be rubbed in order to remove excess solder, dross, burnt flux or other contaminants. The contaminants drop into the water in the well below the sponge and the accumulated residue may be cleaned out from time to time.

In the drawings:

FIG. 1 is a view in perspective illustrating the device of the invention.

FIG. 2 is a cross section on the line 2—2 of FIG. 1.

FIG. 3 is a view showing the parts ready for assembly.

The tip cleaning device consists of a rectangular case 10 having a flat bottom 11 with upstanding sides 12 forming a box-like structure open at the top. A shelf 13 with supporting legs 14 is arranged within the box to have its top surface about midway between the box bottom 11 and the top edges 15 providing a space 16 beneath the shelf forming a reservoir or well for a liquid. A cleaning sponge 17 rests upon the shelf 13 and is of the same outside dimensions as the inside of the case. The supporting shelf extends completly across the box in one direction but in the transverse direction it extends only part way leaving a space for receiving a wick 19. The top surface 18 of the wick contacts with the underside 20 of the sponge 17 while the bottom surface 21 of the wick rests on the inside floor 18' of the case. Thus the wick is at all times in contact with the liquid in the well. The cleaning sponge 17 has a central aperture 22 through the same in alignment with a somewhat larger aperture in the shelf. Preferably the sponge aperture is circular forming a cylindrical inside sponge surface with a circular top sponge edge which surface and edge are the sponge parts with which the soldering iron tip 23 comes in contact during the cleaning process.

When in use, the device of the invention is filled with water to a level slightly below the shelf so that the wick 19 is immersed therein and the water in the wick rises through capillary attraction into the sponge and maintains the sponge in a wet condition as long as there is water in the reservoir. The soldering iron tip is rubbed against the central wiping edge so that excess solder, dross and burnt flux are removed from the tip and fall into the water in the reservoir below leaving the sponge free of contaminants. The solid residue accumulating in the well can easily be removed whenever it is necessary to refill the reservoir. The sponge can be turned over whenever desired to increase its life prior to replacement.

As a first specific example, the device of the invention has a case made of a sturdy non-burn plastic of a size 2 ⅜" × 2 ⅜" × 1 ¼" with walls ⅛" thick, making the inside dimension 2 ⅛" × 2 ⅛" × 1 ⅛". This has been found to be ideal for use with small and miniature soldering irons. The shelf is made of stainless steel which can be fashioned into the shape illustrated from a flat strip with transversely bent ends forming the legs 14, ½" in length. The shelf in its longest dimension is 2 7/16" permitting it to be inserted only within the 2 ½" dimension of the case and not transversely in the smaller 2 ⅜" dimension. The width of this shelf is 2 ⅜" leaving a ½" clearance for the insertion of the wick. The dry thickness of both sponge and wick is about ½" so that they form a snug fit into the recesses provided for them. The hole 22 in the sponge is about ¾" in diameter.

In another specific example, the case instead of being substantially square is an oblong 3 ½" — 2". The case for the device with either of the dimensions referred to, may be of any suitable material which will be sturdy under condition of use but for ease of manufacture is preferably of a thermosetting plastic such as Bakelite or other phenolic resin. Also the bottom 11 of the case is provided with strips 24 of a non-skid material to prevent the device from sliding or tipping when in use. The shelf is preferably of a non-corrodible metal such as aluminum or stainless steel resistant to the liquid used for wetting the sponge. The sponge itself and the wick are preferably of synthetic cellulose but may be made of any other suitable material which when wet will withstand the wiping action of a hot soldering iron tip at a temperature between 350° F. and 800° F., usually about 700° F. The liquid filling the reservoir is usually water but might in some instances have incorporated therein a solvent for the flux base.

The device of this invention is an improvement over devices commonly used for cleaning soldering iron tips. It is a simple design with no complicated parts, no hoses to pull loose, leak or get in the way. No auxiliary bottles are necessary to clean, fill or spill. The low profile case is a self-contained water well. The wiping sponge is maintained in a wet condition for days on one filling, even in a dry atmosphere. The compact size set forth in the first specific example is ideal for small and miniature soldering irons such as American Beauty Bantam irons, Little Dandy irons and others of similar size.

What I claim as my invention is:

1. A device for cleaning the outside surface of a solid pointed soldering iron tip comprising a case closed at the bottom and sides and open at the top forming a water reservoir, a shelf intermediate the bottom and top, a flat sponge pad supported by said shelf above the water level and a wick sponge contacting the underside of said flat sponge and extending into said water level, said shelf provided with a hole therethrough and said flat sponge pad having a central hole aligned with said shelf hole but of smaller size, and extending completely through the thickness thereof forming a cylindrical inner rubbing surface for receiving and engaging longitudinal tapering outer surfaces of said tip whereby the contaminants adhering to said outer tip surfaces can be removed by rubbing action to fall by gravity through the holes in sponge and shelf into the bottom of said water reservoir.

2. A device according to claim 1 in which said shelf is of less area than said case leaving a space adjacent one side thereof, said wick sponge is separate from said sponge pad and is of a size to fill said space from the bottom of said reservoir to the top of said shelf and said flat sponge pad overlays said shelf and said wick sponge and extends to all sides of the case.

3. The device according to claim 2 in which said case is rectangular and of shallow height compared to its length and width, said shelf is of stainless sheet metal with transverse flanges supported on the bottom of said case and said wick sponge and flat sponge pad are both of synthetic cellulose.

4. In a device for cleaning the tips of small or miniature soldering irons to remove excess solder, dross, burnt flux and other surface contaminants from the outer surfaces of the tips by rubbing action and to deposit the same by gravity action, the combination of a generally square box-like case closed at the bottom and sides and open at the top, with its sides of low height compared to length and width forming a low profile, and a plurality of separate parts insertable in said box-like case and readily removable therefrom, comprising a thin flat shelf with depending flanges at opposite ends thereof resting in the inside bottom of said case, said shelf extending laterally for the greater part of the case width leaving a space between one of said shelf flanges and the adjacent side wall, and having the top shelf surface midway between the bottom of the case and the top open end thereof, said shelf having an aperture centrally of said case, a flat sponge pad supported on said shelf and extending for the full area of the case with the top surface slightly below the sides of the case and having a central hole aligned with said shelf hole and extending completely through the thickness thereof forming a cylindrical inner rubbing surface for engaging the outer surface of said tip, said case forming a reservoir to be filled with water rising to the level of said shelf, a second sponge of a size to fill said space adjacent said shelf flange with its top surface contacting the underside of said flat sponge pad and forming a wick to feed the water upwardly into said sponge pad, said case and inserted parts forming an assembly constituting a tip cleaning device adapted to permit engagement of the soldering iron tip with said cylindrical sides surrounding the central hole of the water-moistened sponge pad thereby causing the surface contaminents on said tip to be mechanically removed therefrom and to fall through said sponge and shelf to be accumulated at the bottom of said water reservoir for periodic removal.

* * * * *